United States Patent [19]
Lipper

[11] Patent Number: 4,989,657
[45] Date of Patent: Feb. 5, 1991

[54] MODULAR VEHICLE WHEEL

[75] Inventor: Ray W. Lipper, Newport Beach, Calif.

[73] Assignee: Center Line Tool Co., Inc., Santa Fe Springs, Calif.

[21] Appl. No.: 720,685

[22] Filed: Apr. 8, 1985

[51] Int. Cl.⁵ .............................................. B60B 25/04
[52] U.S. Cl. .................................. 152/399; 152/396; 301/63 DD; 301/9 R; 301/11 CD
[58] Field of Search ............... 152/398, 396, 397, 398, 152/399; 301/63 DD, 63 DS, 9 R, 10 R, 11 R, 11 CD, 35 R

[56]          References Cited
         U.S. PATENT DOCUMENTS

| | | | |
|---|---|---|---|
| 3,114,342 | 12/1963 | Sporck et al. | 301/63 R |
| 3,262,191 | 7/1966 | Albertson et al. | 301/63 R |
| 3,283,800 | 11/1966 | Ischinger et al. | 152/397 |
| 3,826,538 | 7/1974 | Lipper | 301/63 DS |
| 3,880,219 | 4/1975 | Mitchell | 152/404 |
| 3,885,615 | 5/1975 | Mitchell | 152/411 |
| 3,999,588 | 12/1976 | Mitchell | 152/398 |
| 4,505,314 | 3/1985 | Goudy | 152/398 |

FOREIGN PATENT DOCUMENTS 2229109  12/1972  Fed. Rep. of Germany ...... 152/397

Primary Examiner—Russell D. Stormer
Attorney, Agent, or Firm—Spensley Horn Jubas & Lubitz

[57]          ABSTRACT

A two-piece modular automotive wheel includes a rear section having a relatively thick center portion and a thinner rim portion. The rear section is produced by a spin forging process to achieve the desired thickness at various locations. A registration surface is machined in the center portion. A front rim section is secured to the rear section at the registration surface. A locking ring, which may also be spun forged, may be secured to the front rim section to lock the bead of the tire.

4 Claims, 2 Drawing Sheets

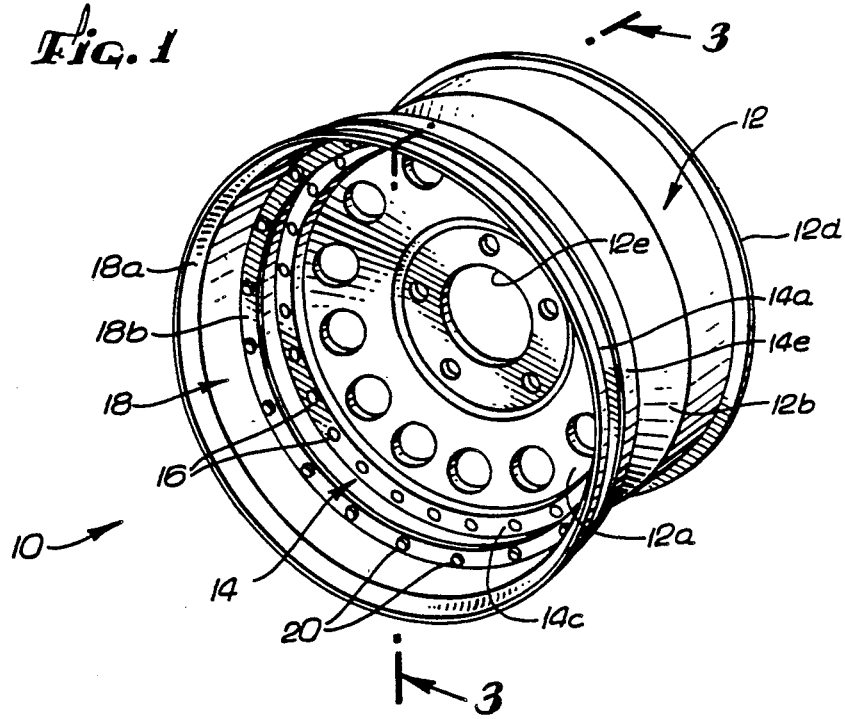
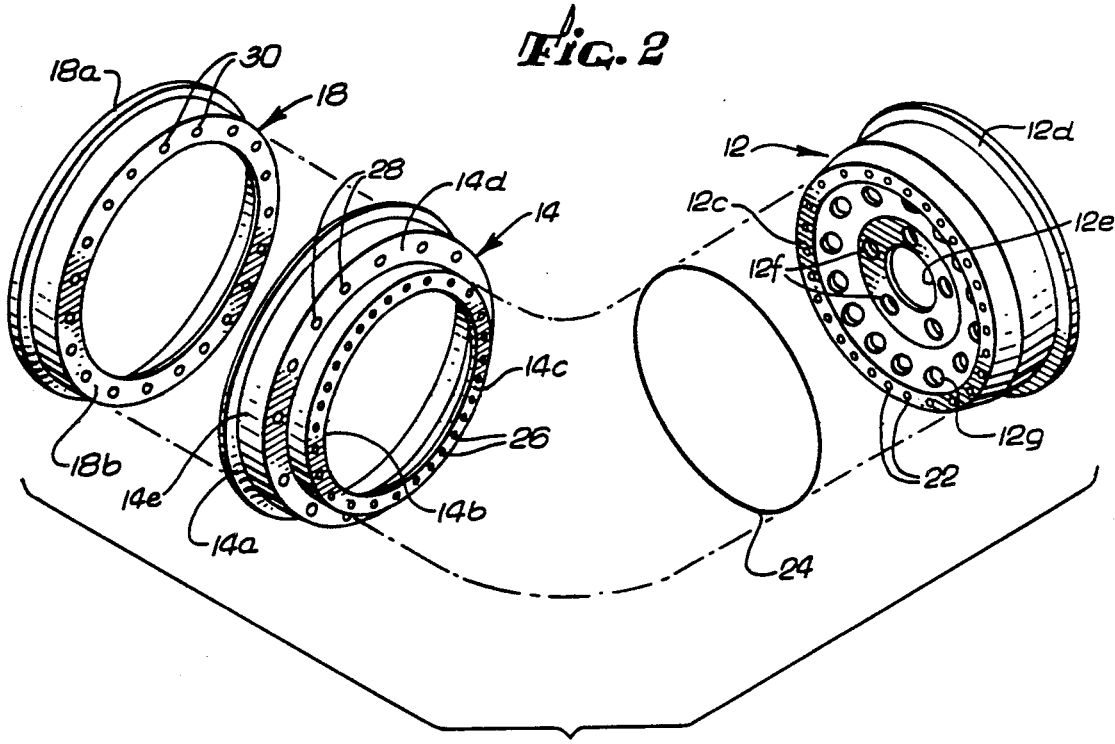

MODULAR VEHICLE WHEEL

BACKGROUND OF THE INVENTION

1. Field of the Invention

The present invention relates to vehicle wheels and more particularly to lightweight automotive wheels made of aluminum. Still more particularly, the present invention relates to modular, high performance automotive wheels.

2. Description of the Prior Art

Many prior art high performance wheels are three-piece types in which a pair of rim sections are secured by means of rivets or otherwise to a center section. Generally, all three pieces of the wheel are formed of aluminum. In order to provide sufficient strength yet minimize the weight of the wheel, the center section has a relatively thick cross section, whereas the rim portions have a thinner cross section. One difficulty encountered in the manufacture of such wheels is that of achieving proper registration of the parts to ensure that they are all coaxial. In addition, the three-piece construction is more complicated, and therefore more expensive, than a typical two-piece wheel.

U.S. Pat. No. 3,826,538, issued to Ray W. Lipper and assigned to Center Line Tool Co., Inc., the same assignee as the present application, discloses a two-piece wheel construction in which two wheel halves are provided and are aligned by means of a centering element including a disk-shaped portion having a central opening and an integral cylindrical collar along the inner circumference thereof. Although the structure provides substantial improvements over prior art wheels, it has the disadvantage of requiring a centering element in addition to the wheel halves. Furthermore, the center section of the resulting wheel is a laminated structure which has a material thickness which is twice that of the rim portions. This structure therefore does not enable the relative thickness of the different portions of the wheel to be optimized.

In order to securely clamp the bead of a tire with respect to the wheel, locking rings which attach to the wheel rim have been developed. Recent locking rings are comprised of one-piece forged aluminum rings which are secured to the wheel rim by means of bolts or the like. Although such locking rings provide the advantage of securely holding a tire, they have the disadvantage of increasing the weight of the wheel.

SUMMARY OF THE INVENTION

The present invention is directed to a novel wheel design in which various portions of the wheel are optimized to provide the necessary strength but with minimum weight. In addition, the wheel design is a two-piece design which is simple, and therefore inexpensive, to manufacture.

Broadly, the wheel of the present invention is a two-piece wheel having a first section including a center portion and a rim portion extending from the center portion. The first section is initially forged to define the shape of the center portion. The section is then subjected to a spin forging process to form the rim portion. The spin forging process is controlled so that the thickness of the cross section of the rim portion is less than that of the center portion. The center portion therefore has sufficient thickness to provide the desired strength, whereas the rim portion, whose strength requirements are not as severe, is thinner to provide decreased weight.

The first section includes a circular registration surface around the periphery of the center portion. In the preferred embodiment of the invention, this surface is machined. A second wheel section is comprised of a rim which has been forged in a standard manner. The center portion of this section has an opening substantially equal to the diameter of the registration surface of the first section and is mated to the registration surface of the first section. The second section therefore defines only a part of the rim of the wheel and does not form a part of the center section of the wheel. No separate centering element is required. Typically, the second section has a cross-sectional thickness which is substantially the same as the thickness of the rim portion of the first section. The two sections are secured together by means of rivets or otherwise, and the resulting wheel has optimum strength and weight characteristics.

In addition to the basic construction described above, the wheel may include a locking ring to lock the bead of a tire. In order to minimize the weight of the ring, it may also be formed by a spin forging process so as to provide separate portions having relatively thick and thin cross sections where necessary.

BRIEF DESCRIPTION OF THE DRAWINGS

The invention will now be described with reference to the accompanying drawings, wherein:

FIG. 1 is a perspective view of the wheel of the present invention;

FIG. 2 is an exploded perspective view of the wheel of the present invention;

DESCRIPTION OF THE PREFERRED EMBODIMENT

Figure 3:
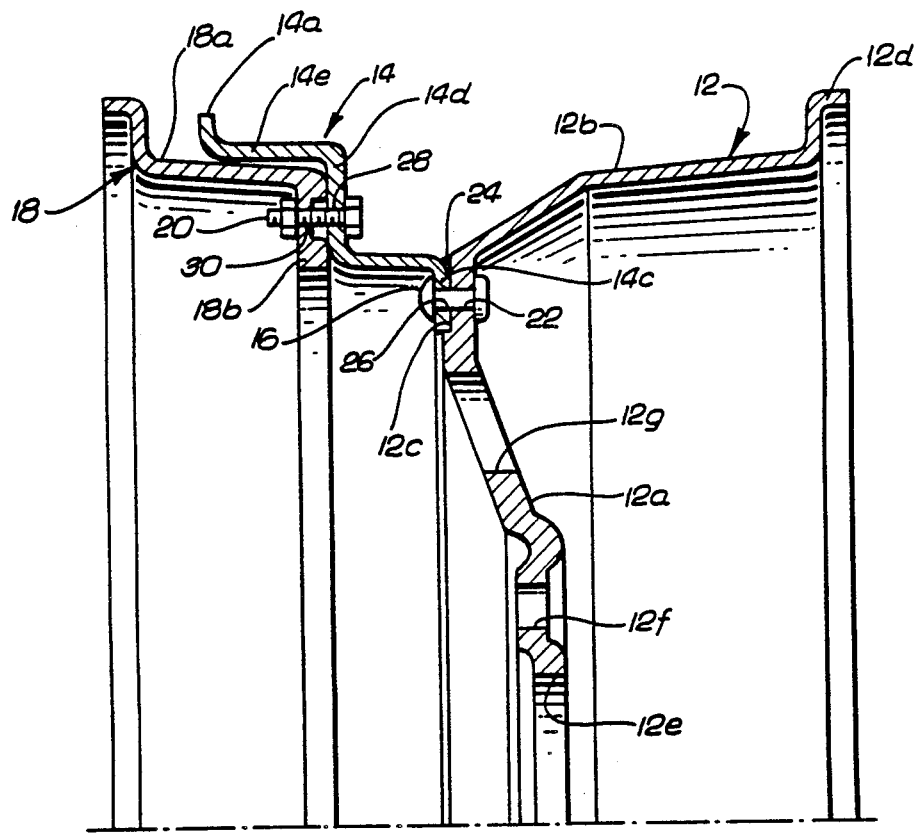
FIG. 3 is a cross-sectional view of the wheel of the present invention.

The following description is of the best presently contemplated mode of carrying out the invention. This description is made for the purpose of illustrating the general principles of the invention and is not to be taken in a limiting sense. The scope of the invention is best determined by reference to the appended claims.

Referring to FIG. 1, a wheel 10 includes a rear section 12 having a center portion 12a and a rim portion 12b. A front rim section 14 is secured to the center portion 12a by means of a plurality of rivets 16. Other means of securing the parts together could be employed. However, rivets are preferred because of their high strength. A tire locking ring 18 is secured to the front of the rim portion 14 by means of bolts 20. The ring 18 serves to clamp the bead of the tire between it and a flange 14a of the rim 14.

Further details of the construction of the wheel of the present invention are shown in FIGS. 2 and 3. The rear section 12 includes a flange 12d at one end of the rim portion 12b. A registration surface 12c is machined at the periphery of the center portion 12a to form a ridge 12h. Rivet holes 22 are formed in the registration surface 12c. The section 12 is provided with a central hub opening 12e as well as a plurality of bolt holes 12f to facilitate securing of the wheel assembly to an axle hub. The rim section 14 includes a registration surface 14c and a central opening 14b whose diameter is slightly greater than the inner diameter of the registration surface 12c i.e., the diameter of the ridge 12h.

An O-ring 24 is provided to ensure an airtight seal between the wheel portions so as to prevent any air leakage from a tire. The O-ring 24 is positioned on the registration surface 12c so that it is located to the outside of the rivet holes 22.

The surface 14c includes a plurality of rivet holes 26 which correspond to the rivet holes 22. At the front end of the rim section 14, the flange 14a includes an intermediate surface 14d which is provided with a plurality of bolt holes 28 for securing the locking ring 18. The exterior portion of the flange 14a is coupled to the portion 14b by means of a short wall portion 14e.

The locking ring 18 includes a flange 18a and a circular interior section 18b having a surface which mates with the surface 14d. This surface includes bolt holes 30 which align with the holes 28.

As seen in FIG. 3, the cross-sectional thickness of the center portion 12a is substantially greater than that of its integral rim portion 12b. This configuration provides the advantage of sufficient strength in all areas combined with absolute minimum weight. Furthermore, the provision of a thick center section 12a enables the registration surface 12c to be machined without materially affecting the strength of the wheel. This eliminates the need for any type of separate centering element, thus significantly reducing the cost of manufacture of the wheel.

The rear section 12 may be produced by means of a spin forging process, i.e., a process in which the section is forged to its desired configuration while it is being spun about the central axis. Although this process is well known in the manufacture of wheels, its use has been limited, as far as the inventor knows, to the production of parts having a uniform thickness throughout. In the present invention, the spin forging process is controlled so that as the section 12b is forged, its cross-sectional thickness is reduced by moving material outward, i.e., in the direction of forging.

Figure 4:
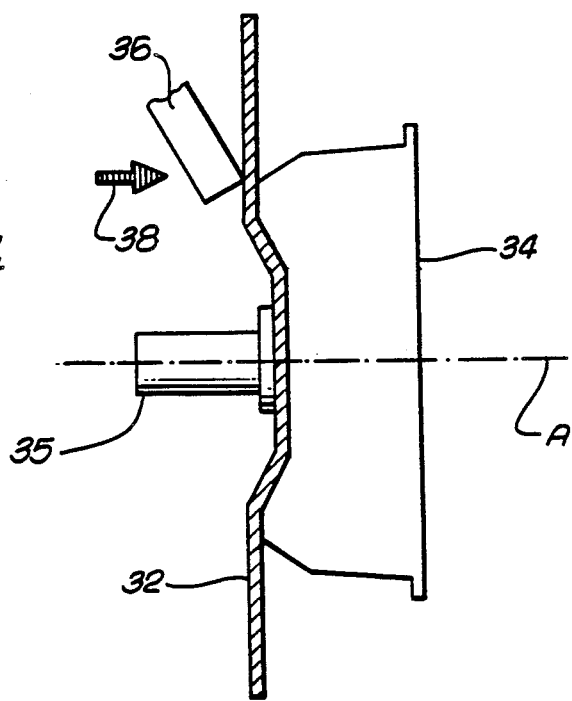
FIG. 4 is a diagrammatic view illustrating the spin forging process used during the manufacture of the wheel of the present invention.

Initially, an aluminum blank is provided and is press forged so as to shape the center section 12a its desired configuration. The blank is then placed on a spin forging machine, the details of which are well known in the art, and is spin forged to form the rim portion 12b and flange 12d. It is during this spin forging operation that the thickness of the aluminum in the area of the rim is reduced. As shown in FIG. 4, a previously press forged blank 32 is secured to a tool 34 of a spin forging machine by means of a tailpiece 35. The tool, blank and tailpiece are spun about an axis A and a roller 36 moves in the direction of an arrow 38 to forge the blank 32 to the contours of the tool 34. In practice, several forging steps may be required in order to bend the blank the desired amount. During the spin forging operation, the roller operates to reposition the metal of the blank in the direction of the arrow 38 so as to provide the thin cross section of the rim portion. In the preferred embodiment of the invention, the center section has a thickness of ⅜" and the rim portion is spin forged down to a thickness of ⅛.

The machining of the registration surface 12c is done with respect to the central axis of the rear wheel section 12 and is controlled so that the surface 12c has an inner diameter which is slightly less than the inner diameter of the outer rim section 14 so that the ridge 12h will precisely center the two sections with respect to each other. The relative thickness of the center portion 12a enables registration between the sections to be achieved by employing the machining process without materially affecting the strength of the resulting wheel. That is, despite the removal of some material during the machining operation, the remaining thickness is sufficient to provide the necessary strength. This is to be contrasted with the inventor's prior laminated design disclosed in U.S. Pat. No. 3,826,538 mentioned above. As a result, no separate centering element is required. In addition, the single layer center section facilitates the provision of lightening holes 12g to further decrease the weight of the wheel without decreasing its strength. Such holes are not feasible with a laminated structure due to the possibility of burrs or other defects.

Since the front rim portion 14 does not form a part of the center section of the wheel, it may be of a uniform thickness and formed by a standard forging operation, e.g., press forging. The locking ring 18 may also be formed by such an operation. However, in order to increase strength at the point where the locking ring is bolted to the front rim 14, it may be desirable to form the section 18b relatively thick compared to the section 18a. Thus, the locking ring may also be formed by the spin forging process described above. Adequate strength can therefore be achieved in the bolt area without requiring unnecessary thickness and weight in the remainder of the ring.

In summary, the present invention provides a wheel structure which avoids many of the compromises associated with prior art designs. A two-piece wheel is provided in which both the center section and rim sections have the desired thickness to achieve necessary strength along with minimum weight. The center section is a single layer of aluminum which may be machined to provide registration for a rim section without adversely affecting the strength of the wheel. The wheel structure is simple, and therefore inexpensive to produce, yet is far lighter and thus better performing than prior art modular designs.

What is claimed is:

1. A modular vehicle wheel comprising:
a one piece first section having a center portion having a central opening therethrough and a first rim extending from the end of the center portion and having a cross-sectional thickness which is less than that of the center portion, said center portion including a peripheral circular machined registration surface spaced from the central opening on the side thereof facing away from the rim, said registration surface defining a circular ridge; and
a second section defining a second rim and having a central opening approximately the same diameter as the diameter of the ridge, wherein the second section is secured to the first section at the registration surface and the ridge centers the second section with respect to the first section and wherein the resulting wheel has first and second rims and a single layer center section extending from the registration surface to the central opening.

2. A wheel according to claim 1 wherein the first section is spin-forged.

3. A wheel according to claim 1 wherein the first and second sections are aluminum.

4. A wheel according to claim 1 wherein the second rim has a first flange portion at the front thereof and further including a one piece locking ring, the locking ring including a planar ring portion secured to the second rim near the front thereof and a second flange portion, wherein the thickness of the ring portion is greater than that of the second flange portion, wherein the flange portions are in a spaced parallel relationship and serve to lock a portion of a tire therebetween.

* * * * *